US011346724B2

(12) United States Patent
Volkerink et al.

(10) Patent No.: US 11,346,724 B2
(45) Date of Patent: May 31, 2022

(54) TEMPERATURE MONITORING IN COLD SUPPLY CHAINS

(71) Applicant: Trackonomy Systems, Inc., Santa Clara, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 16/891,588

(22) Filed: Jun. 3, 2020

(65) Prior Publication Data

US 2020/0386623 A1 Dec. 10, 2020

Related U.S. Application Data

(60) Provisional application No. 62/857,807, filed on Jun. 5, 2019.

(51) Int. Cl.
*G01K 1/02* (2021.01)
*B65D 21/02* (2006.01)
*H02G 3/02* (2006.01)
*B65D 90/48* (2006.01)

(52) U.S. Cl.
CPC .......... *G01K 1/026* (2013.01); *B65D 21/023* (2013.01); *B65D 90/48* (2013.01); *H02G 3/02* (2013.01)

(58) Field of Classification Search
USPC ....................................................... 702/130
See application file for complete search history.

(56) References Cited

U.S. PATENT DOCUMENTS

| | | |
|---|---|---|
| 5,478,991 A | 12/1995 | Watanabe |
| 5,495,250 A | 2/1996 | Ghaem |
| 5,499,717 A | 3/1996 | Hayashi |
| 5,838,253 A | 11/1998 | Wurz |
| 5,917,433 A | 6/1999 | Keillor |
| 6,372,342 B1 | 4/2002 | Karaoglu |
| 6,375,780 B1 | 4/2002 | Tuttle et al. |
| 6,404,341 B1 | 6/2002 | Reid |
| 6,614,392 B2 | 9/2003 | Howard |
| 6,919,803 B2 | 7/2005 | Breed |
| 7,009,517 B2 | 3/2006 | Wood |
| 7,020,701 B1 | 3/2006 | Gelvin et al. |
| 7,048,194 B2 | 5/2006 | Minami et al. |
| 7,177,054 B2 | 2/2007 | Silverbrook et al. |

(Continued)

FOREIGN PATENT DOCUMENTS

| | | |
|---|---|---|
| EP | 1786143 A2 | 5/2007 |
| JP | 2008239282 A | 10/2008 |

(Continued)

OTHER PUBLICATIONS

PCT Application No. PCT/US2018/064919, Written Opinion, dated Apr. 5, 2019, 7 pages.

(Continued)

*Primary Examiner* — Paul D Lee

(57) ABSTRACT

Embodiments disclosed herein includes temperature monitoring in cold supply chains. In this regard, electrical conductors are affixed to containers in respective patterns that enables a set of containers to be arranged in a particular configuration in which the electrical conductors provide electrical connections between electrical conductors and, in aggregate, creates a sensing network that is operable to measure temperature of respective ones of the containers.

20 Claims, 2 Drawing Sheets

(56) References Cited

U.S. PATENT DOCUMENTS

| | | | |
|---|---|---|---|
| 7,259,030 B2 | 8/2007 | Daniels et al. | |
| 7,299,990 B2 | 11/2007 | Hoshina | |
| 7,321,167 B2 | 1/2008 | Zhong et al. | |
| 7,405,656 B2 | 7/2008 | Olsen | |
| 7,511,616 B2 | 3/2009 | Lake | |
| 7,540,603 B2 | 6/2009 | Otsuki | |
| 7,722,249 B2 | 5/2010 | Kim et al. | |
| 7,838,844 B2 | 11/2010 | Wagner | |
| 7,884,727 B2 | 2/2011 | Tran | |
| 8,062,735 B2 | 11/2011 | Bi | |
| 8,072,620 B2 | 12/2011 | Yamamoto et al. | |
| 8,110,254 B1 | 2/2012 | Sharma | |
| 8,171,791 B2 | 5/2012 | Sy et al. | |
| 8,269,633 B2 | 9/2012 | Hollander et al. | |
| 8,292,173 B2 | 10/2012 | Yturralde et al. | |
| 8,401,238 B2 | 3/2013 | Stahlin et al. | |
| 8,448,530 B2 | 5/2013 | Leuenberger et al. | |
| 8,658,455 B2 | 2/2014 | Shin et al. | |
| 8,716,629 B2 | 5/2014 | Klewer et al. | |
| 8,786,510 B2 | 7/2014 | Coleman | |
| 8,833,664 B2 | 9/2014 | Choi | |
| 8,879,276 B2 | 11/2014 | Wang | |
| 8,971,673 B2 | 3/2015 | Beinhocker | |
| 9,015,071 B2 | 4/2015 | Breed | |
| 9,070,286 B2 | 6/2015 | Moore | |
| 9,137,637 B2 | 9/2015 | Bilal et al. | |
| 9,159,635 B2 | 10/2015 | Elolampi et al. | |
| 9,182,231 B2 | 11/2015 | Skaaksrud | |
| 9,183,738 B1 | 11/2015 | Allen et al. | |
| 9,189,226 B2 | 11/2015 | Driesen et al. | |
| 9,372,123 B2 | 6/2016 | Li et al. | |
| 9,473,902 B2 | 10/2016 | Bilal et al. | |
| 9,496,582 B1 | 11/2016 | Lim et al. | |
| 9,543,495 B2 | 1/2017 | Paschkewitz et al. | |
| 9,543,549 B2 | 1/2017 | Bai et al. | |
| 9,583,428 B2 | 2/2017 | Rafferty et al. | |
| 9,632,050 B2 | 4/2017 | Zhong et al. | |
| 9,643,460 B2 | 5/2017 | Peine et al. | |
| 9,644,401 B2 | 5/2017 | Nguyen et al. | |
| 9,753,568 B2 | 9/2017 | McMillen | |
| 9,781,825 B2 | 10/2017 | Farkas et al. | |
| 9,824,329 B2 | 11/2017 | Stirling et al. | |
| 9,860,688 B2 | 1/2018 | Kulkarni et al. | |
| 2003/0000128 A1 | 1/2003 | Wood et al. | |
| 2003/0018927 A1 | 1/2003 | Gadir et al. | |
| 2004/0044493 A1 | 3/2004 | Coulthard | |
| 2004/0131761 A1 | 7/2004 | Shakespeare | |
| 2006/0100299 A1 | 5/2006 | Malik et al. | |
| 2007/0049291 A1 | 3/2007 | Kim et al. | |
| 2007/0095905 A1 | 5/2007 | Kadaba | |
| 2007/0287473 A1 | 12/2007 | Dupray | |
| 2008/0184795 A1* | 8/2008 | Woodard | G01F 23/26 |
| | | | 73/304 C |
| 2008/0198002 A1 | 8/2008 | Bartholf et al. | |
| 2008/0239282 A1 | 10/2008 | Zou et al. | |
| 2009/0051530 A1 | 2/2009 | Brooks et al. | |
| 2009/0072974 A1 | 3/2009 | Miyashita et al. | |
| 2009/0174600 A1 | 7/2009 | Mazlum et al. | |
| 2009/0192709 A1 | 7/2009 | Yonker et al. | |
| 2009/0196267 A1 | 8/2009 | Walker | |
| 2010/0082870 A1 | 4/2010 | Tokuhara | |
| 2010/0096181 A1 | 4/2010 | Nakamura | |
| 2010/0180701 A1 | 7/2010 | Daniel et al. | |
| 2010/0201519 A1* | 8/2010 | Dagher | B65D 90/22 |
| | | | 340/561 |
| 2010/0230498 A1 | 9/2010 | Atherton | |
| 2010/0299401 A1 | 11/2010 | Lloyd | |
| 2011/0251469 A1 | 10/2011 | Varadan | |
| 2012/0271540 A1 | 10/2012 | Miksa et al. | |
| 2012/0278676 A1 | 11/2012 | Teraura | |
| 2013/0107770 A1 | 5/2013 | Marsden et al. | |
| 2013/0131980 A1 | 5/2013 | Ginsberg | |
| 2013/0250357 A1 | 9/2013 | Yu | |
| 2014/0014403 A1 | 1/2014 | Miller et al. | |
| 2014/0240088 A1 | 8/2014 | Robinette et al. | |
| 2014/0265915 A1 | 9/2014 | Huang et al. | |
| 2014/0268780 A1 | 9/2014 | Wang | |
| 2014/0274139 A1 | 9/2014 | Bilal et al. | |
| 2014/0317406 A1 | 10/2014 | Lewis et al. | |
| 2015/0034635 A1* | 2/2015 | Dagher | B32B 3/06 |
| | | | 220/1.5 |
| 2015/0154531 A1 | 6/2015 | Skaaksrud | |
| 2015/0324745 A1 | 11/2015 | Goodall | |
| 2015/0349667 A1 | 12/2015 | Andosca et al. | |
| 2015/0354973 A1 | 12/2015 | Wang et al. | |
| 2015/0382154 A1 | 12/2015 | Bilal et al. | |
| 2016/0011074 A1 | 1/2016 | Mian et al. | |
| 2016/0026213 A1 | 1/2016 | Li et al. | |
| 2016/0147353 A1 | 5/2016 | Fliz et al. | |
| 2016/0205509 A1 | 7/2016 | Hopcraft et al. | |
| 2016/0233927 A1 | 8/2016 | Wu | |
| 2016/0270215 A1 | 9/2016 | Goto | |
| 2016/0370210 A1 | 12/2016 | Kapusta et al. | |
| 2016/0377440 A1 | 12/2016 | Dorum | |
| 2017/0017872 A1 | 1/2017 | Kato et al. | |
| 2017/0025547 A1 | 1/2017 | Cho et al. | |
| 2017/0039666 A1 | 2/2017 | Kuersten et al. | |
| 2017/0079144 A1 | 3/2017 | Coleman et al. | |
| 2017/0161679 A1 | 6/2017 | Stingel et al. | |
| 2017/0337405 A1 | 11/2017 | Schutz | |
| 2018/0003507 A1 | 1/2018 | Arslan et al. | |
| 2018/0046964 A1 | 2/2018 | Leoni et al. | |
| 2018/0104609 A1 | 4/2018 | Musliner | |
| 2018/0165568 A1 | 6/2018 | Khoche | |

FOREIGN PATENT DOCUMENTS

| | | |
|---|---|---|
| JP | 2009230500 A | 10/2009 |
| JP | 2011090670 A | 5/2011 |
| JP | 2012141995 A | 7/2012 |
| WO | 2014195756 A1 | 12/2014 |
| WO | 2016120628 A1 | 8/2016 |
| WO | 2017046699 A1 | 3/2017 |
| WO | 2017100707 A3 | 7/2017 |

OTHER PUBLICATIONS

Dementyev, SensorTape: Modular and Programmable 3D-Aware Dense Sensor Network on a Tape, In Proc. of UIST 2015.

Griffin et al., Adhesive RFID Sensor Patch for Monitoring of Sweat Electrolytes, in IEEE Transactionson Bio-Medical Engineering, Nov. 2014.

Pyo et al., Development of a Map Matching Method Using the Multiple Hypothesis Technique, 2001 IEEE.

Liu, Survey of Wireless Based Indoor Localization Technologies, arXiV:1709.01015v2 [cs.N1] Mar. 14, 2018.

Cheung et al., Least Squares Algorithms for Time-of-Arrival-Based Mobile Location, IEEE Transactions on Signal Processing, vol. 52, No. 4, Apr. 2004, pp. 1121-1128.

Frazier et al., Fully-Drawn Carbon-Based Chemical Sensors on Organic and Inorganic Surfaces, Lab Chip. Oct. 21, 2014; 14(20): 4059-4066. doi:10.1039/c4lc00864b.

Alsheikh et al., Machine Learning in Wireless Sensor Networks: Algorithms, Strategies, and Applications, arXiv:1405.4463v2 [cs.NI] Mar. 19, 2015.

Farooqui et al., A Paper Based Ink Jet Printed Real Time Location Tracking TAB, 2013 IEEE MTT-S International Microwave Symposium Digest (MTT).

Gong et al., Low-Cost Sensor Tape for Environment Sensing Based on Roll-to-Roll Manufacturing Process, In Proc. of IEEE Sensors 2012.

Olyazadeh, Least Square Approach on Indoor Positioning Measurement Techniques, 2012.

Wimmer et al., Modular and Deformable Touch-Sensitive Surfaces Based on Time Domain Reflectometry, UIST 11 Proceedings of the 24th Annual ACM Symposium on User Interface Software and Technology, pp. 517-526, Santa Barbara,CA, USA, Oct. 16-19, 2011.

Olberding et al., A Cuttable Multi-Touch Sensor, Proceeding UIST, 13 Proceedings of the 26th Annual ACM Symposium on User

(56) References Cited

OTHER PUBLICATIONS

Interface Software and Technology, pp. 245-254, St. Andrews, Scotland, United Kingdom, Oct. 8-11, 2013.
Zhang et al., Deep Neural Networks for Wireless Localization in Indoor and Outdoor Environments, Neurocomputing 194 (2016), pp. 279-287.
Roundy et al., Energy Harvester for Rotating Environments Using Offset Pendulum and Nonlinear Dynamics, Smart Materials and Structures, IOP Publishing Ltd, Sep. 9, 2014.
Ku et al., Joint Power Waveforming and Beamforming for Wireless Power Transfer, IEEE Transactions on Signal Processing, vol. 65, No. 24, Dec. 15, 2017, p. 6409.
PCT Application No. PCT/US2019/042488, International Search Report and Written Opinion, dated Nov. 5, 2019.
Shen et al., A Mobility Framework to Improve Heterogeneous Wireless Network Services, Inderscience Enterprises Ltd., 2011.
Iacono, Wireless Sensor Network Protocols, Universidad De Mendoza, Argentina, 2011.

* cited by examiner

TEMPERATURE MONITORING IN COLD SUPPLY CHAINS

BACKGROUND

Embodiments disclosed herein generally relate to cold chain distribution systems, and more specifically to a method and an apparatus for monitoring temperature in cold supply chains.

SUMMARY

In an aspect, the invention includes electrical conductors affixed to containers in respective patterns that enables a set of containers to be arranged in a particular configuration in which the electrical conductors provide electrical connections between electrical conductors and, in aggregate, creates a sensing network that is operable to measure temperature of respective ones of the containers.

The invention also features apparatus operable to implement the method described above and computer-readable media storing computer-readable instructions causing a computer to implement the method described above.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
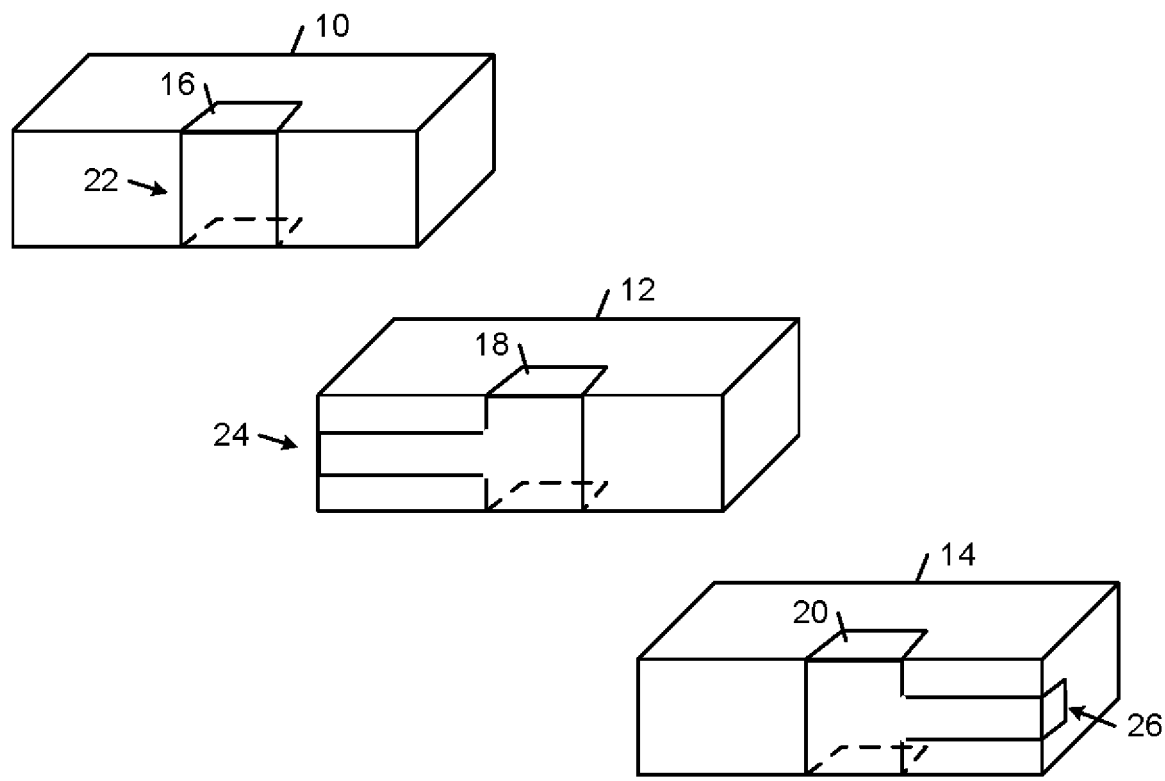
FIG. 1 is a diagrammatic view of a set of containers for transporting perishable goods.

FIG. 1 shows a set of containers 10, 12, 14 for transporting perishable goods. Perishable goods may include fruits, vegetables, grains, beans, nuts, eggs, dairy, seed, flowers, meat, poultry, fish, and pharmaceuticals. The containers 10, 12, 14 typically are configured to be stacked on one another. In some examples, the containers includes shapes or features, such as grooves, notches or recesses that enable the containers to be stacked in a precise stable alignment. The containers 10, 12 14 also are associated with different types of electrical routing segments 16, 18, 20.

In some examples, the electrical routing segments 16, 18, 20 are affixed to the exterior surfaces of the containers 10, 12, 14. In some of these examples, each of the electrical routing segments 16, 18, 20 includes a respective adhesive layer (e.g., a pressure sensitive adhesive) on one side with an optional overlying release layer that can be easily removed. In these embodiments, the electrical routing segments 16, 18, 20 can be affixed to the containers 10, 12, 14 by removing the release layers and pressing the electrical routing segments onto the sides of the containers. In some examples, the electrical routing segments 16, 18, 20 are affixed to or embedded in the containers 10, 12, and 14 during manufacture.

In some embodiments, each electrical routing segment 16, 18, 20 defines a respective routing path 22, 24, 26. For example, the routing segment 16 on the container 10 defines a vertical routing path that extends from the bottom of the container 10 to the top of the container 10. The electrical routing segment 18 defines a vertical routing path and a leftward routing path. The electrical routing segment 20 defines a vertical routing path and a rightward routing path. Other electrical routing segment configurations are designed to cover all permutations.

Figure 2:
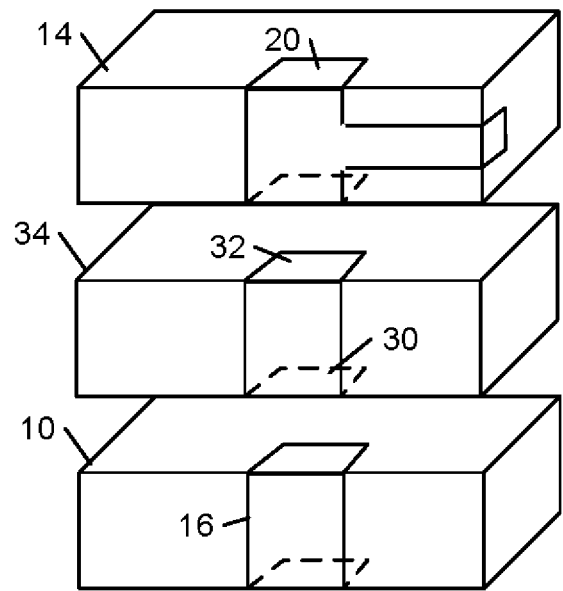
FIG. 2 is an exploded view of a set of containers arranged in a stacking order.

Referring to the exploded view of FIG. 2, the containers 10, 12, 14 may be stacked on top of one another with the terminal ends of the electrical routing segments extending over bottom and top portions of the respective containers with the terminal ends of the adjacent electrical routing segments on adjacent containers overlapping in precise alignment.

Each electrical routing segment 16, 18, 20 includes one or more electrical conductors, wires, or traces. In some embodiments, the one or more electrical conductors, wires, or traces are within a protective sheath or casing, which may be made of plastic. In other embodiments, the one or more electrical conductors, wires, or traces are not protected by a sheath or casing.

As shown in FIG. 2, the top terminal end 28 of the electrical routing segment 16 on container 10 and the bottom terminal end 30 of the electrical routing segment 32 on a container 34 have respective pairs of contact terminals 36, 38 that are used to interconnect the routing segments 16 and 32. In some examples, this process is repeated until all the boxes are interconnected by respective electrical connection topologies. For example, in the embodiment shown in FIG. 2, the top terminal end 20 of the electrical routing segment 26 on a container 14 and the bottom terminal end 30 of the electrical routing segment 32 on a container 34 have respective pairs of contact terminals 37, 39 that are used to interconnect the routing segment 26 with the routing segments 16, 26, and 32.

Figure 3:
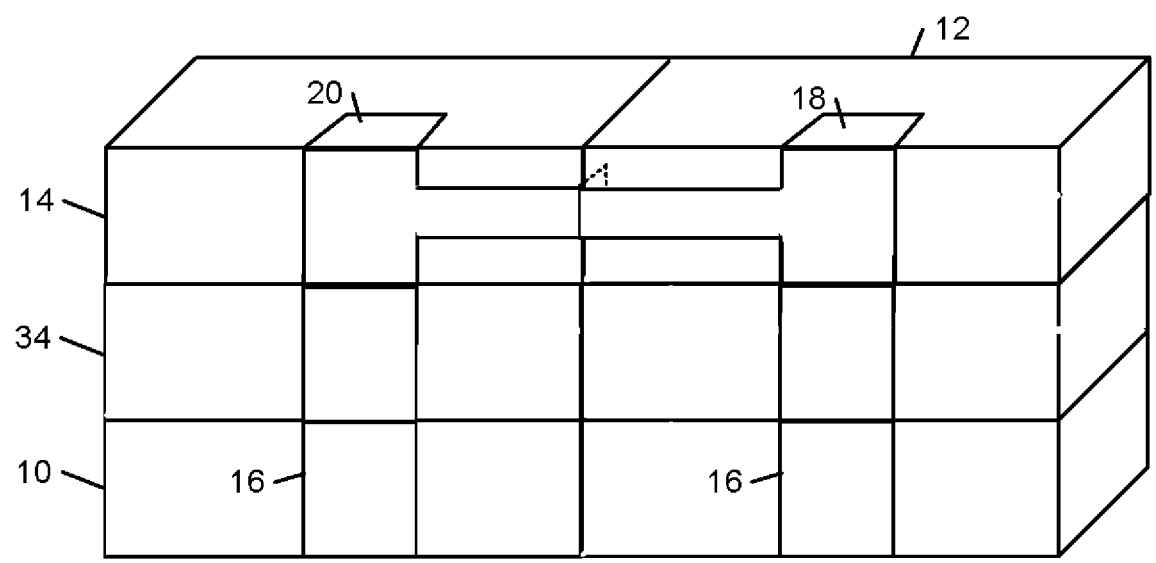
FIG. 3 is diagrammatic view of a stacked set of containers providing wired network connectivity between the containers.

FIG. 3 shows a stack 40 of containers that are interconnected by a network of electrical routing segments.

In some examples, the terminal ends of the electrical routing segments 16 and 32 between containers are electrically connected to a capacitor that includes a dielectric material between electrically conducting plates. In these examples, the input ends of the electrical routing segments 16 and 32 are connected to a source of an alternating voltage to measure temperature as a function of the impedance of the capacitor, which depends on the dielectric properties and the design of the capacitor.

Referring to FIG. 3, in some embodiments, the network circuitry is implemented with at least two electrical conductors, wires, or traces that define respective electrical paths from a master device to each of a set of peripheral devices and a logic circuit to select an electrical path to the target container. The master device includes a master processor (CPU) that controls the peripheral devices. The peripheral devices include respective peripheral processors (CPUs) and respective universally unique identifiers (UUIDs). In some embodiments, each peripheral device is associated with a respective temperature sensor that is located in a respective one of the containers. In some examples, the master device and each of the peripheral devices communicates with each other over two wired connections. In operation, the master device sends a request to a peripheral device associated with a target temperature sensor. In response to the request, the peripheral device reads one or more temperature sensor values from the associated temperature sensor. The peripheral device then sends a reply containing the UUID of the peripheral device and the one or more temperature sensor values to a memory device or to the master device.

In some examples, the master device is equipped with Bluetooth® wireless communications technology to communicate the reported temperature measurements to a user or a network service.

In some embodiments, instead of measuring temperatures of the containers, the network circuitry includes a logic circuit to select an electrical path to a target container and an associated violation detection circuit associated with each peripheral device. In general, the violation detection circuit is configured to detect one or more instances in which ambient conditions compromise the quality of perishable, fresh, chilled/frozen foods, beverages, and temperature sensitive biomedical and pharmaceutical products. An example violation is an instance in which the temperature measured within a transport vehicle is greater than a threshold level. In this example, a sensor that includes two opposing electrically conducting strips separated by an electrically insulating material that has a conductivity that increases with temperature and creates a short circuit between electrically conducting strips in response to the temperature exceeding the threshold level. In some embodiments, the time of the violation is recorded automatically by either the master device or the peripheral device associated with the violation detection circuit.

In response to a violation, the master device is operable to check each row of containers for the violation using triangulation. In some embodiments, instead of measuring temperature at any point in time, the master device transmits signals over the wired connections to locate the source of the violation.

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. Apparatus, comprising electrical conductors affixed to containers in respective patterns that enable the set of containers to be arranged in a particular configuration in which the electrical conductors provide electrical connections between electrical conductors and, in aggregate, creates a sensing network that is operable to measure temperatures of respective ones of the containers, and network circuitry that comprises respective electrical paths from a master device to each of a set of peripheral devices and a logic circuit to select an electrical path to a target container.

2. The apparatus of claim 1, wherein the containers are stackable on one another.

3. The apparatus of claim 2, wherein the containers comprise features that enable the containers to be stacked in a stable alignment.

4. The apparatus of claim 3, wherein the features comprise one or more of grooves, notches, and recesses that provide engagement between adjacent containers.

5. The apparatus of claim 1, wherein respective ones of the containers are associated with different types of electrical routing segments.

6. The apparatus of claim 5, wherein each electrical routing segment comprises one or more electrical conductors.

7. The apparatus of claim 5, wherein the different types of routing segments comprise a vertical routing segment that extends vertically from a bottom of a container to a top of the container.

8. The apparatus of claim 7, wherein the vertical routing segment extends over an area of a top side of the container and over an area of a bottom side of the container.

9. The apparatus of claim 5, wherein the different types of routing segments comprise a vertical routing segment that extends vertically from a bottom of a container to a top of the container and, additionally, extends horizontally in a first direction to a first side of the container.

10. The apparatus of claim 9, wherein the horizontal routing segment extends over an area of the first side of the container.

11. The apparatus of claim 5, wherein the different types of routing segments comprise a vertical routing segment that extends vertically from a bottom of a container to a top of the container and, additionally, extends horizontally in a second direction to a second side of the container.

12. The apparatus of claim 11, wherein the horizontal routing segment extends over an area of the second side of the container.

13. The apparatus of claim 1, wherein respective ones of the electrical conductors are embedded in respective adhesive routing segments.

14. The apparatus of claim 13, wherein respective ones of the adhesive routing segments comprise overlying release layers.

15. The apparatus of claim 1, wherein the master device is operable to control the peripheral devices each of which is associated with a respective peripheral processor, and each peripheral device is associated with a respective temperature sensor that is located in a respective one of the containers.

16. The apparatus of claim 15, wherein the master device and each of the peripheral devices communicates with each other over two-wire connections.

17. The apparatus of claim 15, wherein the master device is operable to send a request to a particular peripheral device associated with a target temperature sensor; in response to the request, the particular peripheral device reads one or more temperature sensor values from the target temperature sensor; and the particular peripheral device is operable to send a reply to the master device comprising an identifier of the particular peripheral device and the one or more temperature sensor values.

18. The apparatus of claim 15, wherein the network circuitry comprises a logic circuit to select an electrical path to a target container and a respective violation detection circuit associated with each peripheral device; wherein the violation detection circuit is configured to detect one or more instances in which ambient conditions compromise the quality of one or more of perishables, fresh foods, chilled/frozen foods, beverages, and temperature sensitive biomedical and pharmaceutical products.

19. The apparatus of claim 18, wherein at least one of the respective temperature sensors comprises two opposing electrically conducting strips separated by an electrically insulating material comprising a conductivity that increases with temperature and creates a short circuit between electrically conducting strips in response to the temperature exceeding the threshold level.

20. The apparatus of claim 19, wherein in response to a violation, the master device is operable to check each row of containers for the violation using triangulation.

* * * * *